Figure 1:
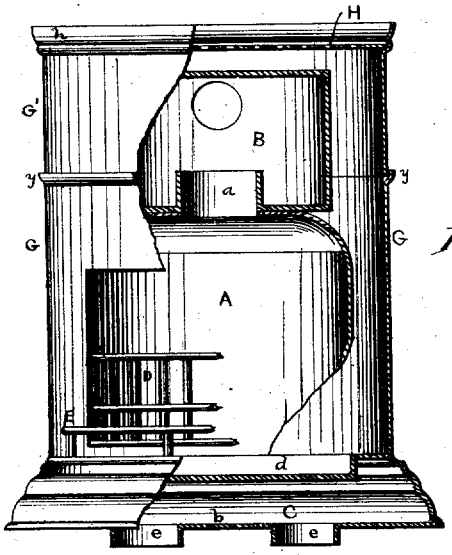
Figure 2:
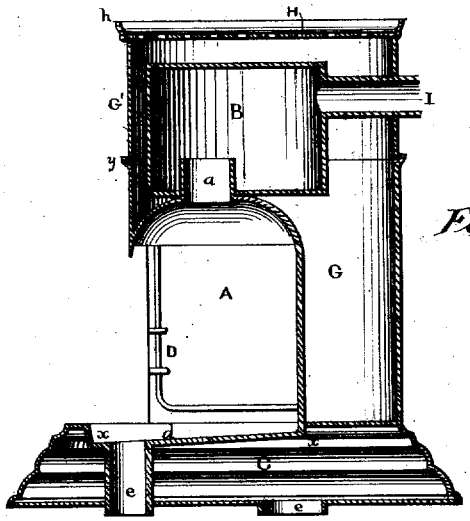
Figure 3:
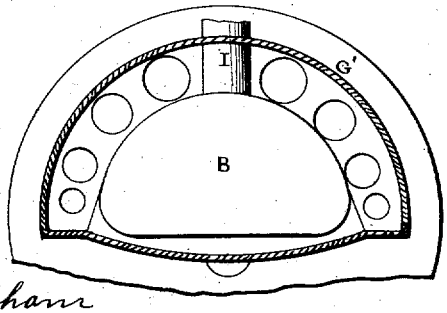

W. L. PHILLIPS.

Fire-Place Heaters.

No. 6,233. Reissued Jan. 12, 1875.

WITNESSES:
E A Winham
Geo W Arnold

INVENTOR:
William L Phillips

THE GRAPHIC CO. PHOTO-LITH. 39 & 41 PARK PLACE, N.Y.

UNITED STATES PATENT OFFICE.

WILLIAM L. PHILLIPS, OF NORMAL, ILLINOIS.

IMPROVEMENT IN FIRE-PLACE HEATERS.

Specification forming part of Letters Patent No. 146,472, dated January 13, 1874; reissue No. 6,233, dated January 12, 1875; application filed July 23, 1874.

*To all whom it may concern:*

Be it known that I, WILLIAM L. PHILLIPS, of Normal, in the county of McLean and State of Illinois, have invented a new and useful Improvement in Heating Apparatus, of which the following is a specification:

My invention consists in a combination of the following instrumentalities, namely: An open-front fire-box, a reverberatory chamber situated above the dome of the said fire-box, constructed so that the products of combustion and the atmospheric air entering therein may reverberate, expand, and largely utilize themselves on the internal surface thereof before passing to the smoke-flue and chimney, and a jacket or casing surrounding both of said first-named elements, for the purpose of causing a suction for and introduction of atmospheric air to the exterior surface of this gas-expansion-chamber, in order to moderately heat such air before passing it out into the room to be warmed.

It will be observed that I have combined with the expansion-chamber of the close stove the open-fronted fire-box of the Franklin stove, and surrounded the exterior surface of both of these instrumentalities with the jacket or casing of the close stove.

The advantages resulting from this improved combination are important. The air which is thrown off from the jacket of the stove is but moderately heated, and hence is not deprived of its moisture, while at the same time the stove radiates heat upon the atmosphere of the room from out of the open fire-box.

A close stove containing an expansion-chamber and a jacket surrounding the whole structure does not accomplish either one of these results for the following reasons, namely: In the last-named stove the products of combustion are generated in a close fire-box, and pass without admixture and in a highly-heated state into the expansion-chamber.

Two, at least, bad effects result from this, namely: First, the metallic surface of the expansion-chamber is in a highly-heated state in the normal action of the fire, and hence the air, passing through the jacket and coming in contact with said surface, is too highly heated, thus deprived of much of its vitality, and rendered partially unfit for breathing. The necessity of the addition of a water-evaporating pan, to partially restore vitality to the air, is as much of a necessity with that stove as with any ordinary form of close stove. Second, there is the absence in the same stove of heat generated and passed into the room by direct radiation from the combustion-chamber and open fire-box.

It may be observed here that the combustion that goes on in the Franklin stove, by reason of admission of oxygen above as well as below the grate, not only, in the present improvement, aids in heating the atmosphere of the room by direct radiation, but it at same time serves a very important office by taking off, with the resulting hot gases, into the expansion-chamber, of a considerable portion of atmospheric air, which dilutes the hot gases in such chamber, not only giving a lower temperature to the heating-surface, but also rendering less harmless the quality of the heated gases resulting from combustion, so that, in case of a slight escape of the same into the space inclosed by the jacket, by reason of defective surface or joints, the heated air being passed into the room is not so much deteriorated, the gases being so much more perfectly combusted by reason of being engaged with oxygen above the grate, and passing thence to the expansion-chamber with a large excess of atmospheric air. These results are not attainable in a close stove.

Fire-place heaters have been constructed with open fronts and having pipes arranged at their rear, in order to take off the products of combustion, while other passages in the bottom of the said heaters lead to such pipes, in order to abstract their heat, as far as practicable, before it passes into the chimney. These pipes, though they have been increased in number so as to each take off a portion of the heat, or have been spread across the rear of the heater in one, still have narrow openings or spaces leading from such rear of heater, or lead into flue-shaped chambers, in which the gases have little or no room to expand, circulate, and reverberate in giving up their heat, and before passing to the pipe leading to the chimney, hence retain all the characteristics of a highly-heated pipe or equivalent space, or of a highly-heated "radiator" surface, instead of being a chamber having an extended surface, which is wholly surrounded with the jacket, so that the heat does not pass directly through it, as though a pipe of greater or less area of opening, but is, in a measure, confined, retarded, and reverberated in its passage, and consequently caused to give up to the surface of the chamber a large amount of heat at a moderate temperature before passing on and out at the opening which leads to the chimney, and without rendering the chamber a highly-heated radiator. My space is distinctively a chamber, as the entrance and the exit are contracted and the intermediate space constructed in a reverberatory shape.

In the fire-place heaters the spaces through which the products of combustion pass are not such chambers, as the products pass rapidly and uninterruptedly through them, or are merely momentarily confined therein, as within a highly-heated radiator, so called, there being no contracted entrance and exit and intermediate enlarged heating-surface constructed in a reverberatory shape. Hence the surfaces are highly heated, and the air in the space exterior to these surfaces much deteriorated. Such do not contain the second above-named element of my combination, hence do not give the results attained by my improvement.

I claim—

An open-front fire-box, in combination with a reverberatory chamber situated above the dome of the said fire-box and a jacket incasing both of said instrumentalities, substantially as and for the purpose described.

WILLIAM L. PHILLIPS.

Witnesses:

GEO. W. ARNOLD,

E. A. WINHAM.